United States Patent
Ryu et al.

(10) Patent No.: US 9,964,050 B2
(45) Date of Patent: *May 8, 2018

(54) METHOD FOR CONTROLLING OF VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/258,022

(22) Filed: Sep. 7, 2016

(65) Prior Publication Data

US 2017/0167400 A1    Jun. 15, 2017

(30) Foreign Application Priority Data

Dec. 10, 2015    (KR) .................. 10-2015-0176330

(51) Int. Cl.
| | |
|---|---|
| F01L 1/00 | (2006.01) |
| F02D 13/02 | (2006.01) |
| F02D 41/00 | (2006.01) |
| F01L 13/00 | (2006.01) |
| F01L 1/053 | (2006.01) |
| F01L 1/34 | (2006.01) |

(52) U.S. Cl.
CPC .......... F02D 13/0215 (2013.01); F01L 1/053 (2013.01); F01L 13/0015 (2013.01);
(Continued)

(58) Field of Classification Search
CPC ............ F02D 13/0215; F02D 13/0261; F02D 13/0226; F02D 41/0007; F02D 2200/101;
(Continued)

(56) References Cited

U.S. PATENT DOCUMENTS

| | | | | |
|---|---|---|---|---|
| 2001/0050067 | A1* | 12/2001 | Sato | .......................... F01L 1/34 |
| | | | | 123/90.17 |
| 2006/0201152 | A1* | 9/2006 | Irisawa | ............... F02D 13/0226 |
| | | | | 60/605.1 |

(Continued)

FOREIGN PATENT DOCUMENTS

| | | |
|---|---|---|
| JP | 2006-046293 A | 2/2006 |
| JP | 2006-336659 A | 12/2006 |
| WO | 2013/171830 A1 | 11/2013 |

*Primary Examiner* — Hung Q Nguyen
(74) *Attorney, Agent, or Firm* — Brinks Gilson & Lione

(57) ABSTRACT

A method for controlling valve timing is provided for a turbo engine provided with a continuous variable valve duration (CVVD) device, a two stage variable valve duration device (VVD) and a continuous variable valve timing (CVVT) device. The method includes: classifying control regions; retarding an intake valve closing (IVC) timing and controlling an exhaust valve to limit a valve overlap in a first region; applying a maximum duration to an intake valve and applying a long duration to the exhaust valve in a second region; applying the long duration to the exhaust valve and advancing the IVC timing in a third region; controlling a throttle valve to be fully opened, applying a short duration to the exhaust valve and retarding an exhaust valve opening (EVO) timing in a fourth region; and controlling the throttle valve to be fully, applying the long duration to the exhaust valve and retarding the IVC timing in a fifth region.

6 Claims, 6 Drawing Sheets

(52) U.S. Cl.
CPC ..... *F02D 13/0226* (2013.01); *F02D 13/0261* (2013.01); *F02D 41/0007* (2013.01); *F01L 1/34* (2013.01); *F01L 2001/0537* (2013.01); *F01L 2013/111* (2013.01); *F01L 2800/00* (2013.01); *F02D 41/009* (2013.01); *F02D 2041/001* (2013.01); *F02D 2041/002* (2013.01); *F02D 2200/101* (2013.01); *Y02T 10/144* (2013.01); *Y02T 10/18* (2013.01)

(58) Field of Classification Search
CPC ........ F02D 2200/1002; F02D 2041/001; F01L 13/0015; F01L 2013/111
See application file for complete search history.

(56) References Cited

U.S. PATENT DOCUMENTS

2008/0275621 A1* 11/2008 Kobayashi .............. F02B 11/00
701/103

| | | | |
|---|---|---|---|
| 2017/0167318 A1* | 6/2017 | Ryu | .................... F01L 13/0015 |
| 2017/0167393 A1* | 6/2017 | Ryu | ........................ F02D 41/26 |
| 2017/0167394 A1* | 6/2017 | Ryu | .................... F02D 13/0215 |
| 2017/0167396 A1* | 6/2017 | Ryu | .................... F02D 41/0002 |
| 2017/0167398 A1* | 6/2017 | Ryu | ........................ F02D 41/26 |
| 2017/0167399 A1* | 6/2017 | Ryu | .................... F02D 13/0215 |
| 2017/0167400 A1* | 6/2017 | Ryu | .................... F02D 13/0215 |
| 2017/0167401 A1* | 6/2017 | Ryu | ......................... F01L 1/34 |
| 2017/0167402 A1* | 6/2017 | Ryu | ..................... B60W 20/10 |
| 2017/0167403 A1* | 6/2017 | Ryu | ..................... B60W 10/06 |
| 2017/0167404 A1* | 6/2017 | Ryu | .................... F02D 13/0215 |
| 2017/0167405 A1* | 6/2017 | Ryu | .................... F01L 13/0015 |
| 2017/0167406 A1* | 6/2017 | Ryu | ......................... F01L 1/34 |
| 2017/0167407 A1* | 6/2017 | Ryu | ......................... F01L 1/34 |
| 2017/0167408 A1* | 6/2017 | Ryu | .................... F02D 13/0215 |
| 2017/0167409 A1* | 6/2017 | Ryu | .................... F02D 13/0215 |
| 2017/0167414 A1* | 6/2017 | Ryu | ........................ F02B 37/00 |
| 2017/0234243 A1* | 8/2017 | Ryu | .................... F02D 13/0207 |
| | | | 123/350 |

* cited by examiner

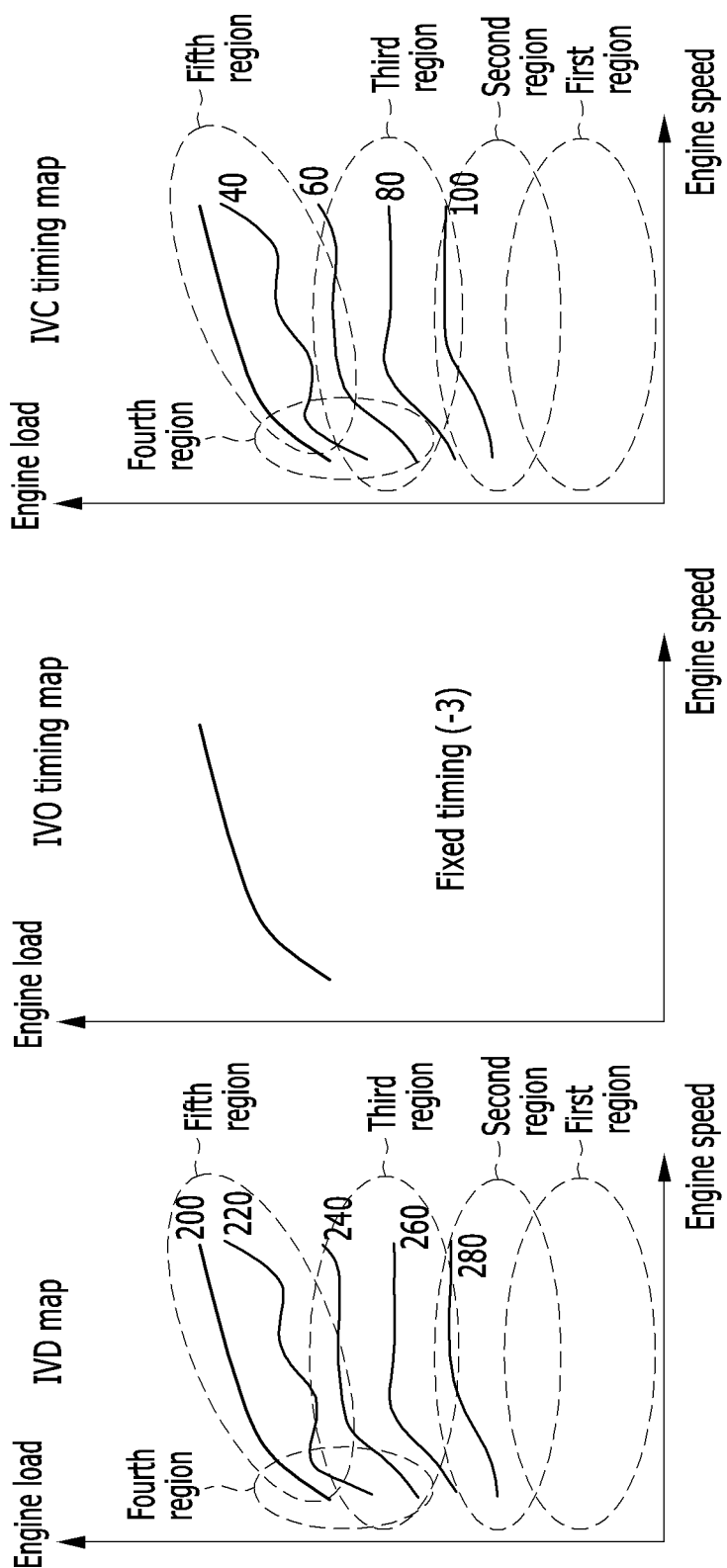

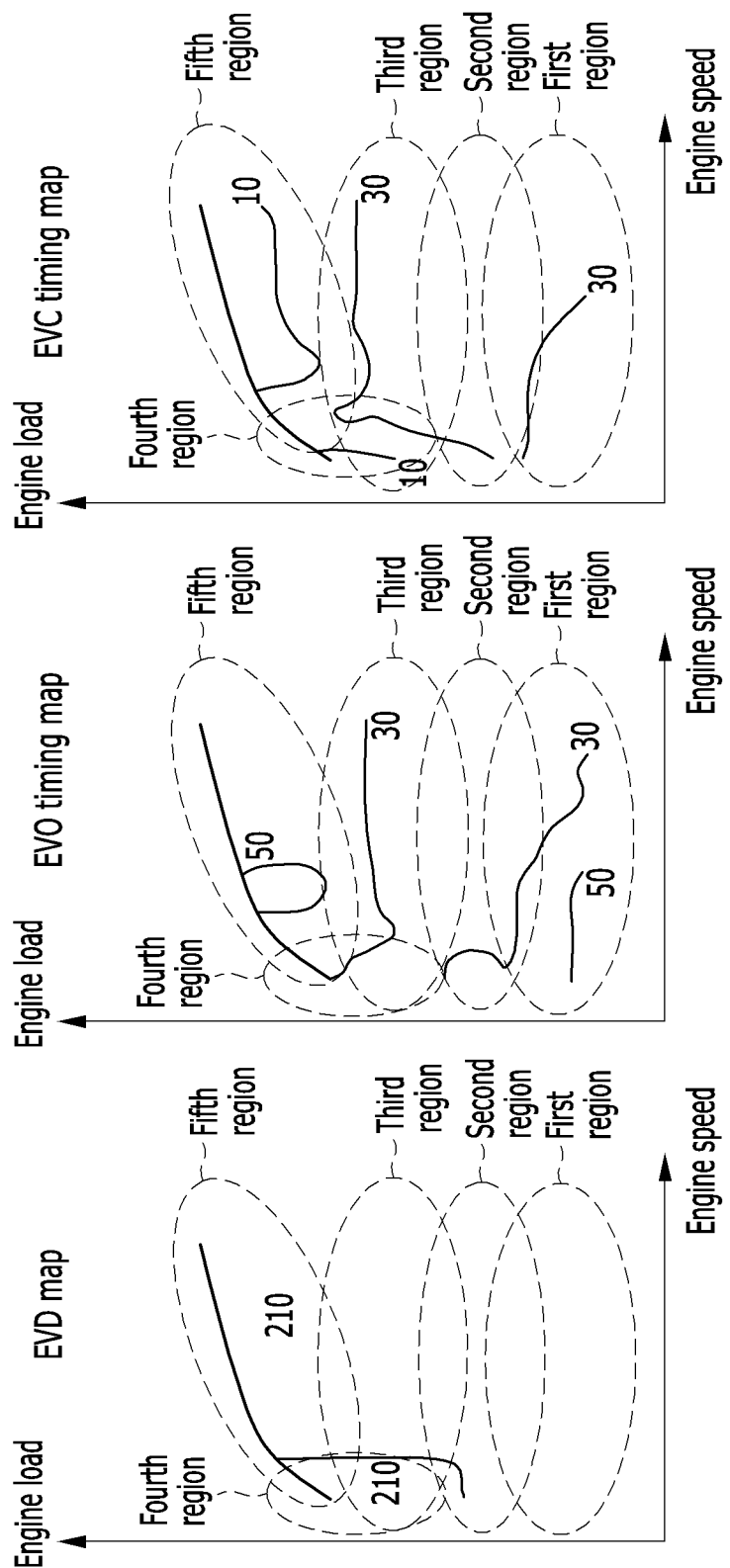
FIG. 5A  EVD map
FIG. 5B  EVO timing map
FIG. 5C  EVC timing map

METHOD FOR CONTROLLING OF VALVE TIMING OF CONTINUOUS VARIABLE VALVE DURATION ENGINE

CROSS-REFERENCE TO RELATED APPLICATION

This application claims priority to and the benefit of Korean Patent Application No. 10-2015-0176330, filed on Dec. 10, 2015, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) may be controlled according to a rotational speed or load of an engine. Therefore, a continuous variable valve duration (CVVD) device controlling the opening duration of an intake valve and an exhaust valve of the engine and a continuous variable valve timing (CVVT) device controlling the opening and closing timing of the intake valve and the exhaust valve of the engine have been developed.

The CVVD device may control opening duration of the valve. In addition, the CVVT device may advance or delay the opening or closing timing of the valve in a state that the opening duration of the valve is fixed. That is, if the opening timing of the valve is determined, the closing timing is automatically determined according to the opening duration of the valve.

The above information disclosed in this Background section is only for enhancement of understanding of the background of the present disclosure and therefore it may contain information that does not form the prior art that is already known to a person of ordinary skill in the art.

SUMMARY

The present disclosure provides a system and a method for controlling valve timing of a continuous variable valve duration engine that simultaneously controls duration and timing of the valve being equipped with a continuous variable valve duration device disposed on an intake valve side and equipped with a two stage variable valve duration device and a continuous variable valve timing device disposed on an exhaust valve side of a turbo engine vehicle by independently controlling an opening and closing timing of an intake valve and an exhaust valve.

A method for controlling valve timing of a turbo engine provided with a continuous variable valve duration (CVVD) device at an intake valve side and a two stage variable valve duration device (VVD) and a continuous variable valve timing (CVVT) device at an exhaust valve side according to one form of the present disclosure may include: classifying a plurality of control regions depending on an engine speed and an engine load; retarding an intake valve closing (IVC) timing by a predetermined angle and controlling an exhaust valve to limit a valve overlap by applying a long duration in a first control region; applying a maximum duration to the intake valve and applying the long duration to the exhaust valve to maintain the valve overlap as a maximum value in a second control region; applying the long duration to the exhaust valve and advancing the IVC timing according to an increase of the engine load in a third control region; controlling a throttle valve to be fully opened, applying a short duration to the exhaust valve and retarding an exhaust valve opening (EVO) timing by a predetermined angle in a fourth control region; and controlling the throttle valve to be fully opened, applying the long duration to the exhaust valve and retarding the IVC timing according to an increase of the engine speed in a fifth control region.

In particular, the first control region includes a region in which an engine load is less than a first predetermined load, the second control region includes a region in which the engine load is greater than or equal to the first predetermined load and less than a second predetermined load, the third control region includes a region in which the engine load is greater than or equal to the second predetermined load and less than a third predetermined load, the fourth control region includes a region in which the engine load is greater than or equal to the second predetermined load and the engine speed is greater than or equal to a first predetermined speed and less than a second predetermined speed, and the fifth control region includes a region in which the engine load is greater than or equal to the third predetermined load and the engine speed is less than the first predetermined speed.

The valve overlap may be limited by retarding the IVC timing by a maximum value and setting an exhaust valve closing (EVC) timing as a maximum value to maintain combustion stability in the first control region.

The valve overlap may be maintained by retarding the EVC timing according to an increase of the engine load in the second control region.

A system for controlling valve timing of a continuous variable valve duration engine provided with a turbo charger according to one form of the present disclosure may include: a data detector detecting data related to a running state of a vehicle; a camshaft position sensor detecting a position of a camshaft; an intake continuous variable valve duration (CVVD) device controlling an opening time of an intake valve of an engine; an exhaust two stage variable valve duration (VVD) device controlling an opening time of an exhaust valve of the engine by two different durations; an exhaust continuously variable valve timing (CVVT) device controlling an opening and closing timing of the exhaust valve of the engine; and a controller configured to classify a plurality of control regions depending on an engine speed and an engine load based on signals from the data detector and camshaft position sensor, and configured to control the intake CVVD device, the exhaust VVD device and the exhaust CVVT device according to the control regions, wherein the a plurality of control regions includes: a first control region when the engine load is less than a first predetermined load; a second control region when the engine load is greater than or equal to the first predetermined load and less than a second predetermined load; a third control region when the engine load is greater than or equal to the second predetermined load and less than a third predetermined load; a fourth control region when the engine load is greater than or equal to the second predetermined load and the engine speed is greater than or equal to a first predetermined speed and less than a second predetermined speed; and a fifth control region when the engine load is greater than or equal to the third predetermined load and the engine speed is less than the first predetermined speed; wherein the controller retards an intake valve closing (IVC) timing by a predetermined angle and controls an exhaust valve to limit a valve overlap by applying a long duration in the first control region, applies a maximum duration to the intake valve and applies the long duration to the exhaust valve to maintain the valve overlap as a maximum value in the second control region, applies the long duration to the exhaust valve and advances the IVC timing according to an increase of the engine load in the third control region, controls a throttle valve to be fully opened and applies a short duration to the exhaust valve and retards an exhaust valve opening (EVO) timing by a predetermined angle in the fourth control region, and controls the throttle valve to be fully and applies the long duration to the exhaust valve and retards the IVC timing according to an increase of the engine speed in the fifth control region.

The controller may limit the valve overlap by retarding the IVC timing by a maximum value and setting an exhaust valve close (EVC) timing as a maximum value to maintain combustion stability in the first control region.

The controller may maintain the valve overlap by retarding the EVC timing according to an increase of the engine load in the second control region.

As described above, according to an exemplary form of the present disclosure, duration and timing of the continuous variable valve are simultaneously controlled, so the engine may be controlled under desired conditions.

That is, opening timing and closing timing of the intake valve and the exhaust valve are properly controlled, thereby improving fuel efficiency under a partial load condition and power performance under a high load condition.

In addition, a starting fuel amount may be reduced by increasing a valid compression ratio, and exhaust gas may be reduced by shortening time for heating a catalyst.

In addition, a continuously variable valve duration device is omitted at the intake, and a two stage variable valve device is used at the exhaust, thereby the cost can be reduced with maintaining power performance.

DRAWINGS

In order that the disclosure may be well understood, there will now be described various forms thereof, given by way of example, references being made to the accompanying drawings, in which:

FIGS. 4A-4C are drawings showing duration, opening timing, and closing timing of an intake valve depending on an engine load and an engine speed according to the present disclosure; and FIGS. 5A-5C are drawings showing duration, opening timing, and closing timing of an exhaust valve depending on an engine load and an engine speed according to the present disclosure.

Figure 1:
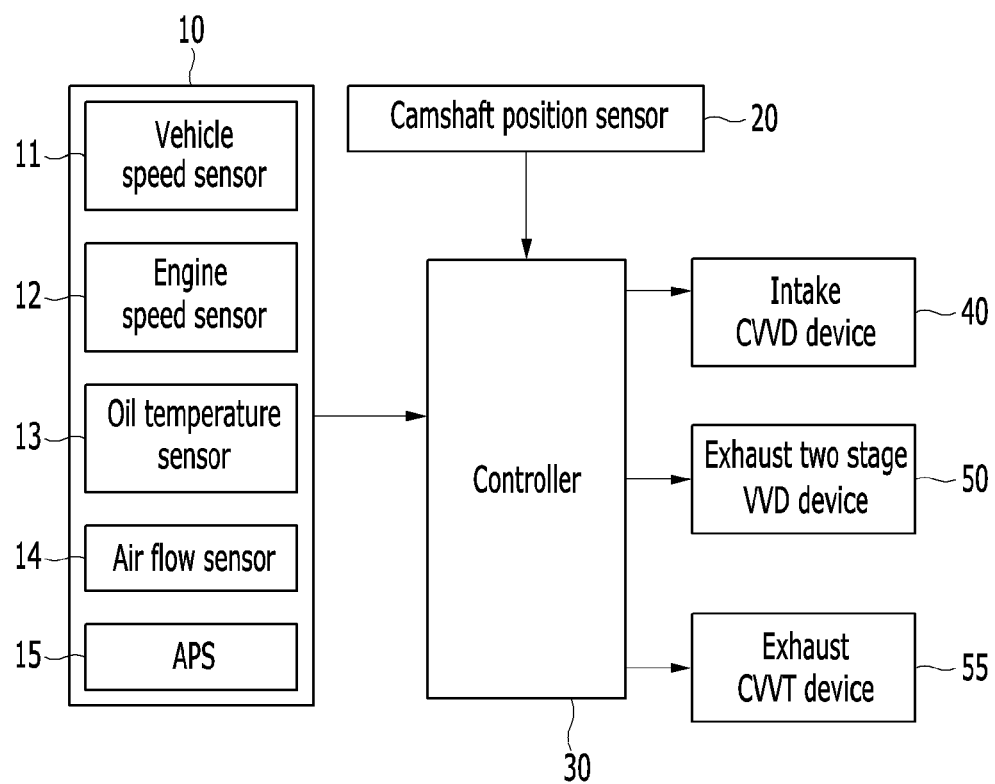
FIG. 1 is a schematic block diagram showing a system for controlling valve timing of a continuous variable valve duration engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to one form of the present disclosure.

As shown in FIG. 1, a system for controlling valve timing of a continuous variable valve duration engine includes: a data detector 10, a camshaft position sensor 20, a controller 30, an intake continuous variable valve duration (CVVD) device 40, an exhaust two stage variable valve duration (VVD) device 50, and an exhaust continuous variable valve timing (CVVT) device 55.

The data detector 10 detects data related to a running state of a vehicle for controlling the intake CVVD device 40, the exhaust two stage VVD device 50 and the exhaust CVVT device 55, and includes a vehicle speed sensor 11, an engine speed sensor 12, an oil temperature sensor 13, an air flow sensor 14, and an accelerator pedal position sensor (APS) 15, although other sensors or systems may be employed to detect or determine the desired data.

The vehicle speed sensor 11 detects a vehicle speed, transmits a corresponding signal to the controller 30, and may be mounted at a wheel of the vehicle.

The engine speed sensor 12 detects a rotation speed of the engine from a change in phase of a crankshaft or camshaft, and transmits a corresponding signal to the controller 30.

The oil temperature sensor (OTS) 13 detects temperature of oil flowing through an oil control valve (OCV), and transmits a corresponding signal to the controller 30.

The oil temperature detected by the oil temperature sensor 13 may be determined by measuring a coolant temperature using a coolant temperature sensor mounted at a coolant passage of an intake manifold. Therefore, in one form, the oil temperature sensor 13 may include a coolant temperature sensor, and the oil temperature should be understood to include the coolant temperature.

The air flow sensor 14 detects an air amount drawn into the intake manifold, and transmits a corresponding signal to the controller 30.

The accelerator pedal position sensor (APS) 15 detects a degree in which a driver pushes an accelerator pedal, and transmits a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake passage may be used instead of the accelerator pedal position sensor 15. Therefore, in one form, the accelerator pedal position sensor 15 may include a throttle valve position sensor, and the position value of the accelerator pedal should be understood to include an opening value of the throttle valve.

The camshaft position sensor 20 detects a change of a camshaft angle, and transmits a corresponding signal to the controller 30.

Figure 2:
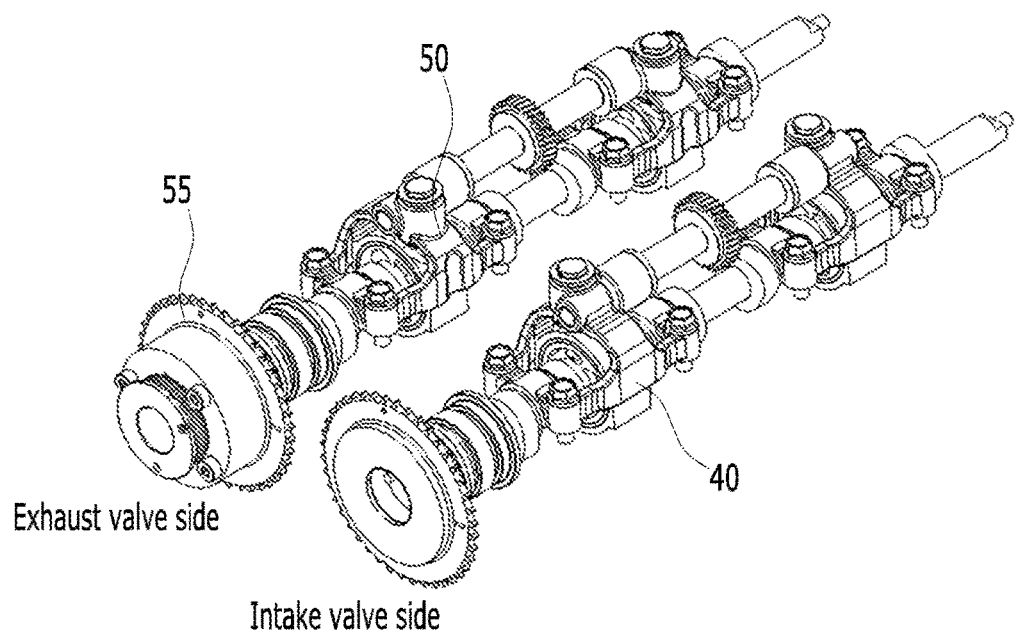
FIG. 2 is a perspective view showing a continuous variable valve duration device provided on an intake valve side and a two stage variable valve duration device and a continuous variable valve timing device which are provided on an exhaust valve side according to one form of the present disclosure.

As shown in FIG. 2, a continuous variable valve duration device is mounted on the intake side through a fixed opening device, and two stage variable valve duration device and a continuous variable valve timing device are mounted on the exhaust side. Therefore, an intake valve opening (IVO) timing is fixed in one form of the present disclosure. For example, the IVO timing may be fixed at an angle before a top dead center of approximately 0 to 10 degrees at most of part load regions so as to be advantageous fuel efficiency.

The intake continuous variable valve duration (CVVD) device 40 controls an intake valve opening time of the engine according to a signal of the controller 30.

The exhaust two stage variable valve duration (VVD) device 50 controls an opening time of an exhaust valve of the engine by switching two different durations according to a signal of the controller 30. That is, the exhaust two stage VVD device 50 can omit the motor and a corresponding sensor compared to an exhaust CVVD device thereby reducing manufacturing costs.

If exhaust duration becomes long, high speed performance and fuel efficiency may be improved, however low speed performance may be deteriorated. Thus, a short duration for low speed performance and a long duration for high speed performance may be determined through a predetermined test. For example, the short duration may be determined at an angle of approximately 180 to 210 degrees, and the long duration may be determined at an angle of approximately 240 to 250 degrees.

Accordingly, the exhaust two stage VVD device 50 may apply the short duration and the long duration to the exhaust valve by switching.

The exhaust continuous variable valve timing (CVVT) device 55 controls opening and closing timing of the exhaust valve of the engine according to a signal from the controller 30.

The controller 30 classifies a plurality of control regions depending on an engine speed and an engine load based on signals from the data detector and camshaft position sensor, and controls the intake CVVD device 40, the exhaust two stage VVD device 50, and the exhaust CVVT device 55 according to the control regions. Herein, the plurality of control regions may be classified into six regions.

The controller 30 may retard an intake valve closing (IVC) timing by a predetermined angle and control an exhaust valve to limit a valve overlap by applying a long duration in a first control region, apply a maximum duration to the intake valve and apply the long duration to the exhaust valve to maintain the valve overlap as a maximum value in a second control region, and apply the long duration to the exhaust valve and advance the IVC timing according to an increase of the engine load in a third control region. And the controller 30 may control a throttle valve to be fully opened and apply a short duration to the exhaust valve and retard an exhaust valve opening (EVO) timing by a predetermined angle in a fourth control region, and control the throttle valve to be fully opened and apply the long duration to the exhaust valve and retard the IVC timing according to an increase of the engine speed in a fifth control region.

For these purposes, the controller 30 may be implemented as at least one processor that is operated by a predetermined program, and the predetermined program may be programmed in order to perform each step of a method for controlling valve timing of a continuous variable valve duration engine according to one form of the present disclosure.

Various forms described herein may be implemented within a recording medium that may be read by a computer or a similar device by using software, hardware, or a combination thereof, for example.

The hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
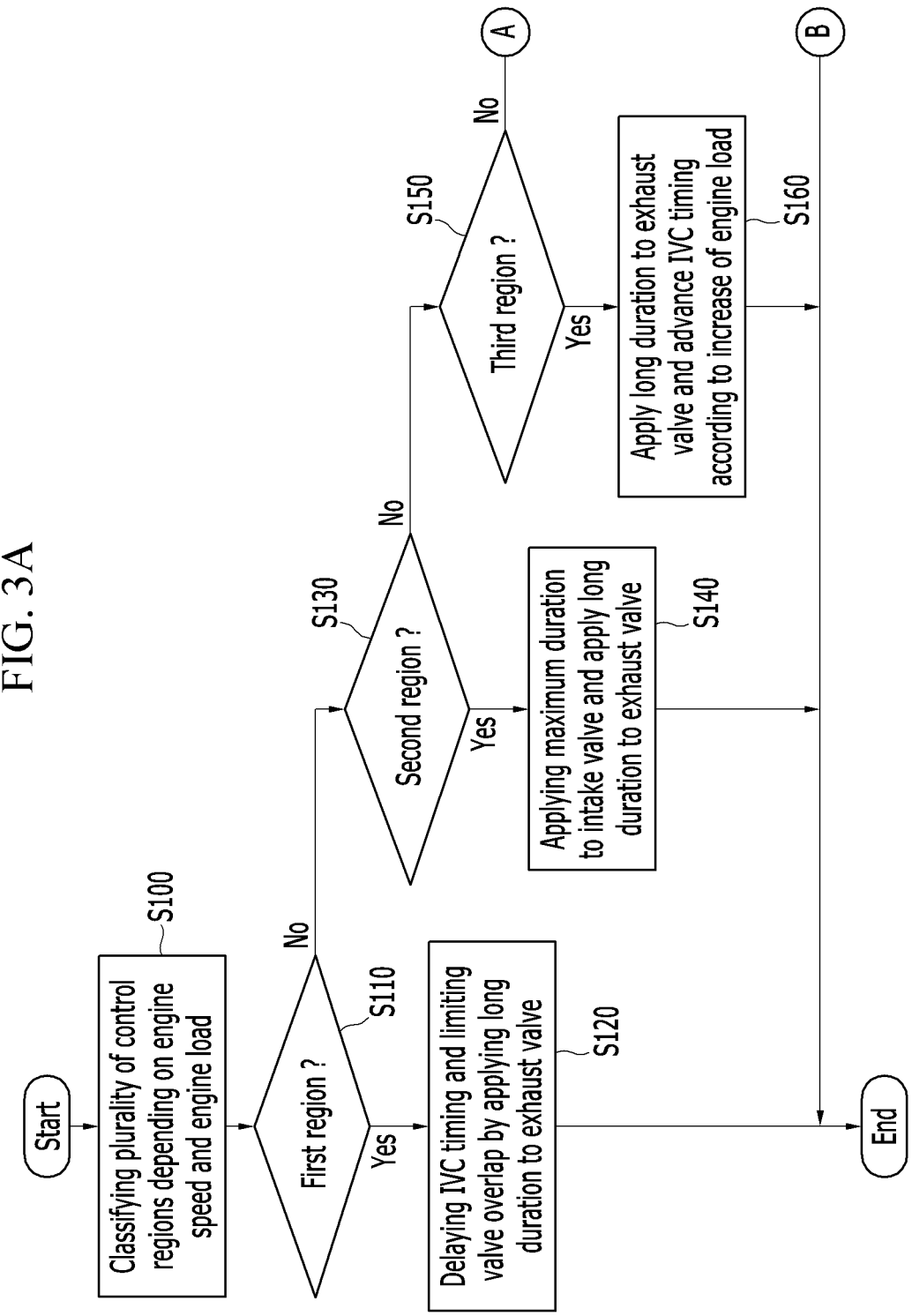
FIG. 3A and FIG. 3B are flowcharts showing a method for controlling valve timing of a continuous variable valve duration engine according to one form of the present disclosure.
Figure 3B:
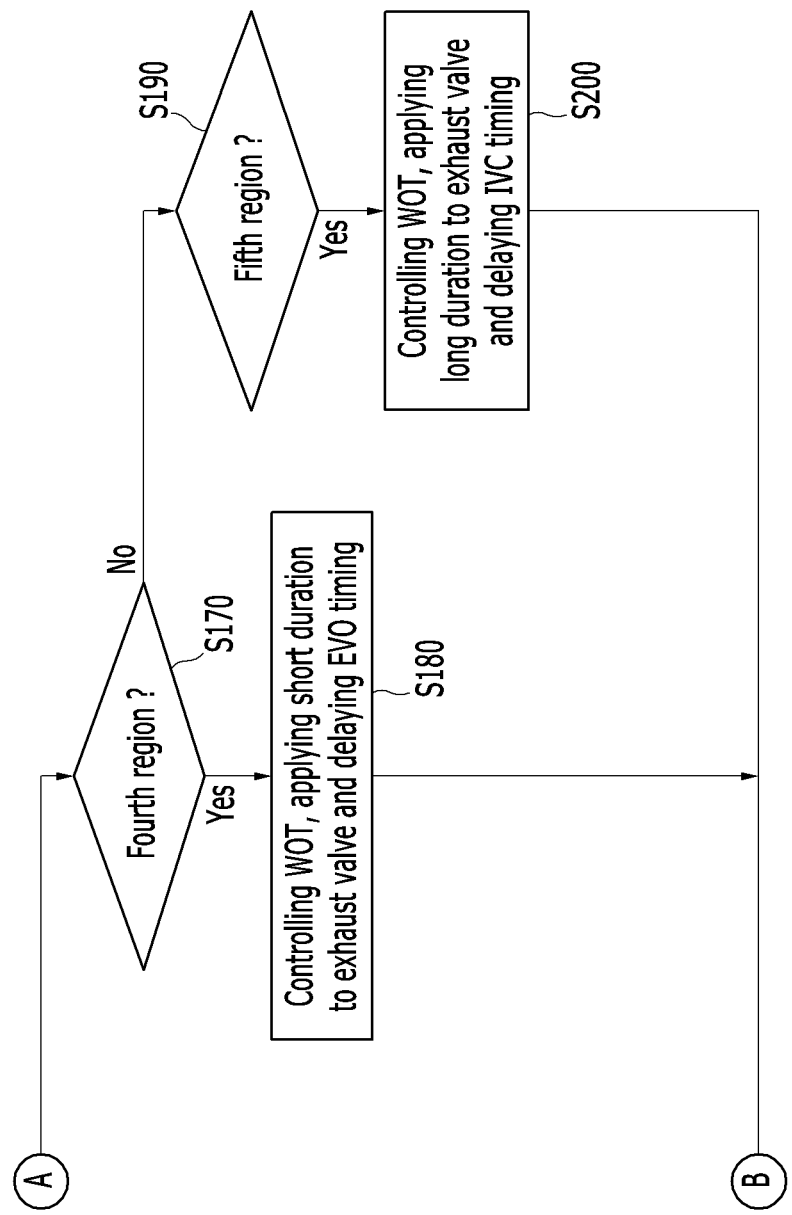

FIG. 3A and FIG. 3B are flowcharts showing a method for controlling valve timing of a continuous variable valve duration engine according to one form of the present disclosure. FIGS. 4A-4C are drawings showing duration, opening timing, and closing timing of an intake valve depending on an engine load and an engine speed according to one form of the present disclosure, and FIGS. 5A-5C are drawings showing duration, opening timing, and closing timing of an exhaust valve depending on an engine load and an engine speed according to one form of the present disclosure.

In FIGS. 4A-4C and FIGS. 5A-5C, an IVD map and an EVD map indicate a crank angle, an IVO timing map indicates an angle before a top dead center, an IVC timing map indicates an angle after a bottom dead center, an EVO timing map indicates an angle before the bottom dead center, and an EVC timing map indicates an angle after the top dead center.

As shown in FIG. 3A and FIG. 3B, a method for controlling valve timing of a continuous variable valve duration engine starts with classifying a plurality of control regions depending on an engine speed and an engine load by the controller 30 at step S100.

The control regions will be described with reference to FIGS. 4A-4C and FIGS. 5A-5C. The first to fifth control regions are indicated in the FIGS. 4A-4C and FIGS. 5A-5C.

The controller 30 may classify control regions as a first control region when the engine load is less than a first predetermined load, a second control region when the engine load is greater than or equal to the first predetermined load and less than a second predetermined load, and a third control region when the engine load is greater than or equal to the second predetermined load and less than a third predetermined load. In addition, the controller 30 may classify control regions as a fourth control region when the engine load is greater than or equal to the second predetermined load and the engine speed is greater than or equal to a first predetermined speed and less than a second predetermined speed, and a fifth control region when the engine load is greater than or equal to the third predetermined load and the engine speed is less than the first predetermined speed.

Meanwhile, referring to FIGS. 4A-4C and FIGS. 5A-5C, a crank angle is marked in an intake valve duration (IVD) map and an exhaust valve duration (EVD) map, which indicating the opening time of the intake valve and exhaust valve. For example, regarding the IVD map in FIG. 4A, a curved line written as a number 200 at inner side of the fourth region means that the crank angle is approximately 200 degrees, a curved lined marked as a number 220 at outer side of the number 200 means that the crank angle is approximately 220 degrees. Although not shown in the drawing, the crank angle which is more than approximately 200 degree and less than approximately 220 degree is positioned between the curved line of the number 200 and the curved line of the number 220.

In addition, a unit of number designated in an intake valve opening (IVO) timing map is before a top dead center(TDC), a unit of number designated in an intake valve closing (IVC) timing map is after a bottom dead center (BDC), a unit of number designated in an exhaust valve opening (EVO) timing map is before BDC, and a unit of number designated in an exhaust valve closing (EVC) map is after TDC.

Each region and curved line in FIGS. 4A-4C and FIGS. 5A-5C are exemplary forms of the present disclosure, it may be modified within the technical idea and scope of the present disclosure.

Referring to FIG. 3A to FIG. 5C, the control regions are classified according to the engine speed and load in the step of S100. After that, the controller 30 determines whether the engine state is under the first region (i.e., first control region) at step S110.

In the step of S110, if the engine load is less than a first predetermined load, the controller 30 determines that the engine state is under the first region. At this time, the controller 30 retards an intake valve closing (IVC) timing by a predetermined angle and controls an exhaust valve to limit a valve overlap by applying a long duration at step S120. The valve overlap is a state where the intake valve is opened and the exhaust valve is not closed yet.

As described above, since the IVO timing is fixed approximately 0 to 10 degrees after a top dead center, the IVC timing is maximally retarded in the first region in which the engine load is low so as to be advantageous fuel efficiency. Accordingly, as shown in FIGS. 4A-4C, the controller 30 may retards the IVC timing at about approximately 100 degrees after BDC and maintain a late intake valve closing (LIVC) position.

In addition, the controller 30 may limit the valve overlap by applying the long duration to the exhaust valve and setting the EVC timing as a maximum value to maintain combustion stability. At this time, as shown in FIGS. 5A-5C, the EVO timing can be controlled at approximately 50 degrees before the BDC.

When the current engine state does not belong to the first region at the step S110, the controller 30 determines whether the current engine state belongs to the second region (i.e., second control region) at step S130.

When the current engine state belongs to the second region at the step S130, the controller 30 applies a maximum duration to the intake valve and applies the long duration to the exhaust valve to maintain the valve overlap as a maximum value at step S140.

That is, the controller 30 may control the valve overlap to maintain the maximum value by retarding the EVC timing after the TDC according to an increase of the engine load in the second control region.

In addition, the controller 30 may apply the maximum duration to the intake valve to inhibit or prevent knocking according to an increase of the engine load and maintain a late intake valve closing (LIVC) position.

When the current engine state does not belong to the second region at the step S130, the controller 30 determines whether the current engine state belongs to the third region (i.e., third control region) at step S150.

When the current engine state belongs to the third region at the step S150, the controller 30 applies the long duration to the exhaust valve and advances the IVC timing according to an increase of the engine load at step S160.

At this time, since the valve overlap is increased by advancing the IVC timing, the controller 30 can decrease the valve overlap by fixing the exhaust CVVT device to a locking position.

Referring to FIGS. 5A-5C, the long duration is applied to the exhaust valve in the second and third regions, so the long duration may be determined as an angle of approximately 240 to 250 degrees to decrease exhaust pumping and increase the valve overlap in the second region and decrease the valve overlap in the third region.

When the current engine state does not belong to the third region at the step S150, the controller 30 determines whether the current engine state belongs to the fourth region (i.e., fourth control region) at step S170.

If the engine state is under the fourth region in the S170, the controller 30 controls a throttle valve to be fully opened, applies a short duration to the exhaust valve, and retards an EVO timing by a predetermined angle at step S180.

In the fourth region when the engine speed is less than the predetermined speed (e.g., approximately 1500 rpm), the controller 30 can secure engine performance by reducing exhaust interference and generating generate scavenging phenomenon. For this purpose, as shown in FIGS. 5A-5C, the controller 30 may control the EVO timing close to the bottom dead center and apply the short duration instead of the long duration to the exhaust valve. With reference to a switching line as shown in FIGS. 5A-5C, a left side of the drawing is a region to which the short duration is applied, and a right side of the drawing is a region to which the long duration is applied.

However, in the present disclosure, the effect of the scavenging phenomenon may not be noticeable because the IVO timing is fixed.

When the current engine state does not belong to the fourth region at the step S170, the controller 30 determines whether the current engine state belongs to the fifth region (i.e., fifth control region) at step S190.

When the current engine state belongs to the fifth region at the step S190, the controller 30 controls the throttle valve to be fully opened, applies the long duration to the exhaust valve and retards the IVC timing according to an increase of the engine speed at step S200.

For example, if the throttle valve is fully opened in the fifth control region of which the engine speed is greater than or equal to the predetermined speed (e.g., approximately 1500 rpm), the long duration of the exhaust is desired to increase exhaust pumping as the scavenging phenomenon disappears. Therefore, the controller 30 may apply the long duration to the exhaust valve by switching the short duration applied in the fourth control region, and may delay the IVC timing according to an increase of the engine speed.

The IVC timing may be controlled at an angle of approximately 20 degrees after a bottom dead center at a low engine speed that is less than the predetermined speed. After that, IVC timing may be delayed at an angle of approximately 60 degrees after the bottom dead center as the engine speed is increased with reference to FIGS. 4A-4C.

As described above, duration and timing of the continuous variable valve are simultaneously controlled, so the engine may be controlled under desired conditions.

That is, since opening timing and closing timing of the intake valve and the exhaust valve are appropriately controlled, the fuel efficiency under a partial load condition and engine performance under a high load condition are improved. In addition, a starting fuel amount may be reduced by increasing a valid compression ratio, and exhaust gas may be reduced by shortening time for heating a catalyst.

In addition, a continuously variable valve timing device is omitted at the intake and a two stage variable valve device is used at the exhaust, thereby the cost can be reduced with maintaining power performance.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A method for controlling valve timing of a turbo engine provided with a continuous variable valve duration (CVVD) device on an intake valve side and with a two stage variable valve duration device (VVD) and a continuous variable valve timing (CVVT) device on an exhaust valve side, the method comprising:
    classifying, by a controller, a plurality of control regions depending on an engine speed and an engine load;
    retarding, by the controller, an intake valve closing (IVC) timing by a predetermined angle and controlling an exhaust valve to limit a valve overlap by applying a long duration in a first control region;
    applying, by the controller, a maximum duration to the intake valve and applying the long duration to the exhaust valve to maintain the valve overlap as a maximum value in a second control region;
    applying, by the controller, the long duration to the exhaust valve and advancing the IVC timing according to an increase of the engine load in a third control region;
    controlling, by the controller, a throttle valve to be fully opened, applying a short duration to the exhaust valve and retarding an exhaust valve opening (EVO) timing by a predetermined angle in a fourth control region; and
    controlling, by the controller, the throttle valve to be fully opened, applying the long duration to the exhaust valve and retarding the IVC timing according to an increase of the engine speed in a fifth control region,
    wherein the first control region includes a region in which the engine load is less than a first predetermined load,
    the second control region includes a region in which the engine load is greater than or equal to the first predetermined load and less than a second predetermined load,
    the third control region includes a region in which the engine load is greater than or equal to the second predetermined load and less than a third predetermined load,
    the fourth control region includes a region in which the engine load is greater than or equal to the second predetermined load and the engine speed is greater than or equal to a first predetermined speed and less than a second predetermined speed, and
    the fifth control region includes a region in which the engine load is greater than or equal to the third predetermined load and the engine speed is less than the first predetermined speed.

2. The method of claim 1, wherein
    the valve overlap is limited by retarding the IVC timing by a maximum value and setting an exhaust valve closing (EVC) timing as a maximum value to maintain combustion stability in the first control region.

3. The method of claim 1, wherein
    the valve overlap is maintained by retarding an EVC timing according to an increase of the engine load in the second control region.

4. A system for controlling valve timing of a continuous variable valve duration engine provided with a turbo charger, the system comprising:
    a data detector configured to detect data related to a running state of a vehicle;

a camshaft position sensor configured to detect a position of a camshaft;

an intake continuous variable valve duration (CVVD) device configured to control an opening time of an intake valve of an engine;

an exhaust two stage variable valve duration (VVD) device configured to control an opening time of an exhaust valve of the engine by two different durations;

an exhaust continuously variable valve timing (CVVT) device configured to control an opening and closing timing of the exhaust valve of the engine; and a controller configured to classify a plurality of control regions depending on an engine speed and an engine load based on signals from the data detector and camshaft position sensor, and configured to control the intake CVVD device, the exhaust two stage VVD device and the exhaust CVVT device according to the control regions, wherein the plurality of control regions includes:
- a first control region determined by the controller when the engine load is less than a first predetermined load,
- a second control region determined by the controller when the engine load is greater than or equal to the first predetermined load and less than a second predetermined load,
- a third control region determined by the controller when the engine load is greater than or equal to the second predetermined load and less than a third predetermined load,
- a fourth control region determined by the controller when the engine load is greater than or equal to the second predetermined load and the engine speed is greater than or equal to a first predetermined speed and less than a second predetermined speed, and
- a fifth control region determined by the controller when the engine load is greater than or equal to the third predetermined load and the engine speed is less than the first predetermined speed, and wherein the controller retards an intake valve closing (IVC) timing by a predetermined angle and controls the exhaust valve to limit a valve overlap by applying a long duration in the first control region, applies a maximum duration to the intake valve and applies the long duration to the exhaust valve to maintain the valve overlap as a maximum value in the second control region, applies the long duration to the exhaust valve and advances the IVC timing according to an increase of the engine load in the third control region, controls a throttle valve to be fully opened and applies a short duration to the exhaust valve and retards an exhaust valve opening (EVO) timing by a predetermined angle in the fourth control region, and controls the throttle valve to be fully opened and applies the long duration to the exhaust valve and retards the IVC timing according to an increase of the engine speed in the fifth control region.

5. The system of claim 4, wherein
the controller limits the valve overlap by retarding the IVC timing by a maximum value and by setting an exhaust valve closing (EVC) timing as a maximum value to maintain combustion stability in the first control region.

6. The system of claim 4, wherein
the controller maintains the valve overlap by retarding an exhaust valve closing (EVC) timing according to an increase of the engine load in the second control region.

* * * * *